United States Patent
Griep

(10) Patent No.: US 8,595,704 B2
(45) Date of Patent: *Nov. 26, 2013

(54) EXTENSIBLE AND UNOBTRUSIVE SCRIPT PERFORMANCE MONITORING AND MEASUREMENT

(75) Inventor: Jonathan P. Griep, Wilton, CT (US)

(73) Assignee: Huawei Technologies Co., Ltd. (CN)

( * ) Notice: Subject to any disclaimer, the term of this patent is extended or adjusted under 35 U.S.C. 154(b) by 1290 days.

This patent is subject to a terminal disclaimer.

(21) Appl. No.: 12/395,692

(22) Filed: Mar. 1, 2009

(65) Prior Publication Data

US 2009/0164977 A1   Jun. 25, 2009

Related U.S. Application Data

(62) Division of application No. 11/106,785, filed on Apr. 15, 2005, now Pat. No. 7,519,958.

(51) Int. Cl.
*G06F 9/45* (2006.01)

(52) U.S. Cl.
USPC ........................................... 717/127

(58) Field of Classification Search
USPC ........................................... 717/127
See application file for complete search history.

(56) References Cited

U.S. PATENT DOCUMENTS

| | | | |
|---|---|---|---|
| 6,567,767 B1 * | 5/2003 | Mackey et al. | 702/186 |
| 6,763,380 B1 * | 7/2004 | Mayton et al. | 709/224 |
| 7,519,958 B2 * | 4/2009 | Griep | 717/127 |
| 2005/0154688 A1 * | 7/2005 | Bolt et al. | 706/14 |
| 2008/0086285 A1 * | 4/2008 | Gombas et al. | 702/187 |

* cited by examiner

*Primary Examiner* — John Chavis
(74) *Attorney, Agent, or Firm* — Huawei Technologies Co., Ltd.

(57) ABSTRACT

A method, system and apparatus for the extensible and unobtrusive performance monitoring and measurement for scripts executing through a script engine. A script performance monitoring and measurement system can include a script engine programmed to execute a provided script and a script processor configured to provide a script to the script engine for execution. Importantly, the system can include a performance monitor disposed between the script processor and the script engine.

6 Claims, 2 Drawing Sheets

EXTENSIBLE AND UNOBTRUSIVE SCRIPT PERFORMANCE MONITORING AND MEASUREMENT

CROSS-REFERENCE TO RELATED APPLICATIONS

This application is a Divisional of U.S. application Ser. No. 11/106,785, filed Apr. 15, 2005, entitled "EXTENSIBLE AND UNOBTRUSIVE SCRIPT PERFORMANCE MONITORING AND MEASUREMENT," the entirety of which is incorporated herein by reference.

BACKGROUND OF THE INVENTION

1. Statement of the Technical Field

The present invention relates to the field of software application performance monitoring and measurement and more particularly to the monitoring and measurement of script performance executing within a script engine.

2. Description of the Related Art

The art of software development extends far beyond a mere coding of a functional specification for a computer program. Modern software development conforms to a lifecycle which begins with the functional specification leading into the formulation of a suitable architecture for an application implementing the functional specification. The lifecycle continues with the physical coding of the application and includes iterative testing and modification cycles to ensure the integrity of the code. Finally, the execution of the completed code can be analyzed to facilitate the further revision of the code to improve the performance of the code.

Traditional performance testing of a computer program can include the external monitoring of the performance of the program, either subjectively based upon end user impression, or objectively based upon independently acquired performance metrics. In the latter circumstance, the performance of the program can include an internal monitoring of the code through software test tooling as is known in the art. Specifically, code under study can be instrumented with additional functionality to record and report performance metrics which can be analyzed online or offline to determine the performance of the tooled code.

Trends in computer science have included a larger emphasis upon program logic which is no longer confined to mere compiled code. Due in part to the explosion of network distributable application logic such as Web based applications, processor specific compiled logic no longer meets the requirements of a widely distributable application involving many different types of computing platforms. To accommodate the new paradigm, script logic has supplanted compiled logic at least in the context of the network distributable computing application.

Generally, script logic involves a platform agnostic set of instructions which, at run-time, can be interpreted by a script engine. The script engine can translate the agnostic set of instructions into platform specific instructions which in turn can be executed in the specific platform. Examples include not only client side, Web browser based and server-side executed scripts such as Javascript and VBScript, but also more traditional scripting environments including Perl. Thus, while script logic generally has existed in one form or another for decades, including rudimentary forms of the BASIC programming language, the popularization of the Internet has breathed new life into this mode of computing.

Due in large part to the structural difference between compiled code and interpreted code, testing the performance of a script involves different considerations than those encountered when testing the performance of compiled code. Specifically, whereas compiled code can be fast as a native implementation of program logic, interpreted script can be relatively slow due to the requirement that the script is interpreted on the fly. As such, to interject instrumentation into the script itself can produce an intrusive element which can affect the performance so as to render the test results useless. Moreover, code reuse for the instrumented code can be difficult at best. Yet, without the proper instrumentation, it is not possible to effectively monitor and measure the performance of a script as the script is interpreted within a script engine.

SUMMARY OF THE INVENTION

The present invention addresses the deficiencies of the art in respect to software testing and performance monitoring and provides a novel and non-obvious method, system and apparatus for the extensible and unobtrusive performance monitoring and measurement for scripts executing through a script engine. A script performance monitoring and measurement system can include a script engine programmed to execute a provided script and a script processor configured to provide a script to the script engine for execution. Importantly, the system can include a performance monitor disposed between the script processor and the script engine.

The performance monitor can be configured to intercept scripts provided by the script processor and intended for execution in the script engine, and to monitor and measure script performance when executed by the script engine. In one aspect of the invention, in order to intercept scripts provided by the script processor, the performance monitor can implement an interface for the script engine. Additionally, the system can include a data store of metrics collected by the performance monitor.

A script performance monitoring and measurement method can include intercepting a request to a script engine to execute a referenced script. The method further can include initiating a process externally from the script engine to collect performance metrics for the referenced script. Finally, the method can include requesting the script engine to execute the referenced script. The intercepting step can include exposing an interface for the script engine for executing a script, and accepting a method call defined by the interface to execute a referenced script. The initiating step can include recording a start time for executing the referenced script in the script engine, recording a stop time for completing the executing of the referenced script, and computing a time of execution for the referenced script.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for the unobtrusive and extensible performance monitoring and measurement of a script executing through a script engine. In accordance with the present invention, a performance monitor can implement the interface of a script engine and can intercept calls to the script engine for interpreting a provided script. Responsive to the interception of a call to execute the provided script, performance monitoring and measurement for the provided script can be established externally to the script engine and the provided script. Subsequently, the performance monitor can forward a request to the script engine for the interpretation of the script.

The skilled artisan will recognize several previously unrecognized advantages to the system, method and apparatus of the present invention. For example, neither the provided script nor the underlying script engine need be instrumented such that the performance of the script can be influenced by the instrumentation. Rather, the instrumentation is confined to a third party intermediary—the performance monitor. Also, as the instrumentation is confined to an intermediary, the logic of the instrumentation itself can be changed without affecting the underlying script or script engine which provides a previously unattainable level of extensibility for the performance monitoring logic.

Figure 1:
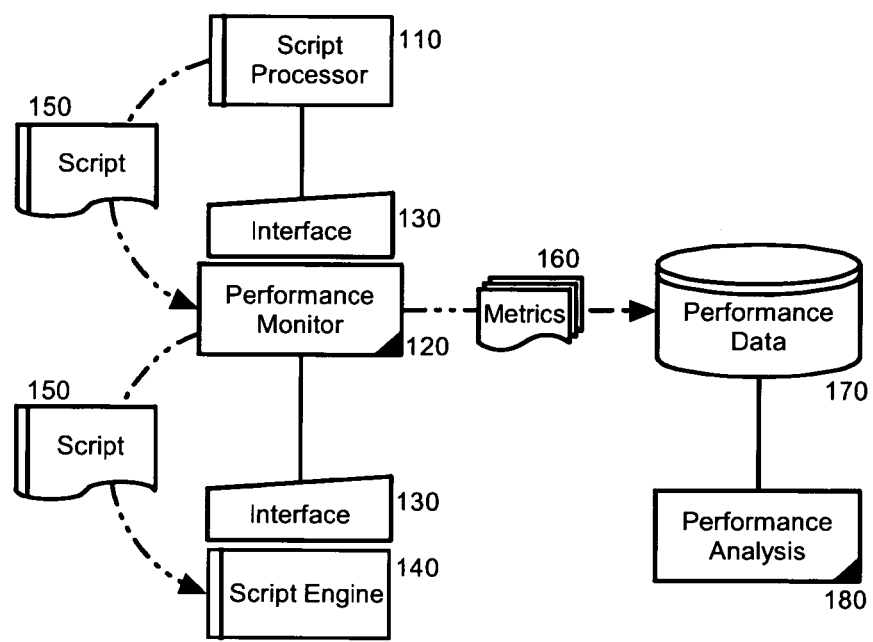
FIG. 1 is a schematic illustration of a system configured for the unobtrusive and extensible performance monitoring and measurement of a script executing through a script engine; and, FIG. 2 is a flow chart illustrating a process for the unobtrusive and extensible performance monitoring and measurement of a script executing through a script engine.

In further illustration of a particular aspect of the present invention, FIG. 1 is a schematic illustration of a system configured for the unobtrusive and extensible performance monitoring and measurement of a script executing through a script engine. The system can include a script processor 110 configured to request the interpretation or execution of a script by the script engine 140. As shown in FIG. 1, a performance monitor 120 can be disposed intermediately to the script processor 110 and the script engine 140.

Specifically, the performance monitor 120 can implement at least a portion of the same interface 130 to the script engine 140 as the script engine 140, itself. Subsequently, the performance monitor can be configured to intercept function calls from the script processor 110 to the script engine 140. Consequently, the script processor 110 can remain unaware that the performance monitor 120 is not the script engine 140 for purposes of requesting the interpretation or execution of the script 150.

Once the performance monitor 120 has been intermediately disposed between the script engine 140 and the script processor 110, the performance monitor 120 can both pre-process and post-process function calls from the script processor 110 to interpret or execute the script 150. Specifically, the performance monitor 120 can configure instrumentation for the script so as to collect metrics 160 in a compilation of performance data 170 for the script 150. Separate performance analysis logic 180 can process the performance data 170 to both monitor and measure the performance of the script 150.

Figure 2:
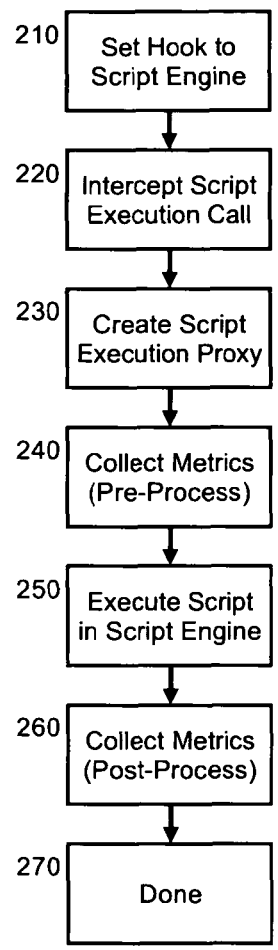

In further illustration, FIG. 2 is a flow chart illustrating a process for the unobtrusive and extensible performance monitoring and measurement of a script executing through a script engine. Beginning in block 210, a hook can be set to the script execution process implemented by the script engine. Subsequently, in block 220 a script execution call intended for the script engine can be intercepted in the performance monitor. Responsive to the interception of the execution call, the performance monitor can create a script execution proxy which can act as the executing script from the perspective of the calling script processor.

Once the performance monitor has been configured to intercept calls to the script engine for executing a designated script, the performance of the script during execution can be monitored and measured in blocks 240 through 260 before the process can end in block 270. To that end, both pre-processing and post-processing operations can be performed in the course of monitoring and measuring the performance of the script during its execution in the script engine. By way of example, pre-processing can include setting a start time for beginning the execution of the script while post-processing can include recording an end time when the execution of the script in the script engine has completed.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A script performance monitoring and measurement system comprising:
   a script engine programmed to execute a provided script;
   a script processor configured to provide a script to said script engine for execution; and,
   a performance monitor disposed between said script processor and said script engine and configured to intercept scripts provided by said script processor and intended for execution in said script engine, and to monitor and measure script performance when executed by said script engine.

2. The system of claim 1, wherein said performance monitor implements an interface for said script engine.

3. The system of claim 1, further comprising a data store of metrics collected by said performance monitor.

4. A machine readable storage medium having stored thereon a computer program product comprising a computer program for script performance monitoring and measurement, the computer program comprising a routine set of instructions which when executed by a machine causes the machine to perform the steps of:

intercepting a request to a script engine to execute a referenced script;

initiating a process externally from said script engine to collect performance metrics for said referenced script; and, requesting said script engine to execute said referenced script.

5. The machine readable storage of claim 4, wherein said intercepting step comprises the steps of:

exposing an interface for said script engine for executing a script; and, accepting a method call defined by said interface to execute a referenced script.

6. The machine readable storage of claim 4, wherein said initiating step comprises the steps of:

recording a start time for executing said referenced script in said script engine;

recording a stop time for completing said executing of said referenced script; and, computing a time of execution for said referenced script.

\* \* \* \* \*